(12) United States Patent
Wang (10) Patent No.: US 9,551,428 B2
(45) Date of Patent: Jan. 24, 2017

(54) VERSATILE AIR-VALVE CONNECTING DEVICE

(71) Applicant: BETO ENGINEERING AND MARKETING CO., LTD., Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 0 days.

(21) Appl. No.: 14/710,049

(22) Filed: May 12, 2015

(65) Prior Publication Data

US 2016/0201815 A1 Jul. 14, 2016

(30) Foreign Application Priority Data

Jan. 13, 2015 (TW) .............................. 104101121 A (51) Int. Cl.
*F16K 11/044* (2006.01)
*F16K 15/20* (2006.01)
(Continued)

(52) U.S. Cl.
CPC .......... *F16K 15/205* (2013.01); *F16K 11/076* (2013.01); *F16K 31/524* (2013.01); *B60S 5/04* (2013.01)

(58) Field of Classification Search
CPC ............ F16K 15/20; F16K 1/04; F16K 3/262; F16K 3/267; F16K 15/205; F16K 31/524; F16K 11/048; F16K 31/52416; F16K 11/076; B60S 5/04; B60C 23/10; B60C 29/06; Y10T 137/266; Y10T 137/2688;Y10T 137/3584; Y10T 137/3693; Y10T 137/3724; Y10T 137/86911; Y10T 137/86928; Y10T 137/87056; Y10T 137/87064; Y10T 137/8708; Y10T 137/9029; Y10T 137/86895

(Continued)

(56) References Cited

U.S. PATENT DOCUMENTS 5,638,865 A * 6/1997 Wu ...................... F16K 11/0876
137/223
5,645,100 A * 7/1997 Chuang ................. F04B 33/005
137/223

(Continued)

FOREIGN PATENT DOCUMENTS

TW 229716 9/1994
TW M243596 9/2004

*Primary Examiner* — Craig J Price
(74) *Attorney, Agent, or Firm* — Muncy, Geissler, Olds & Lowe, P.C.

(57) ABSTRACT

A versatile air-valve connecting device includes two valve connectors and a rotator. The two valve connectors each have an air inlet. The rotator has a cam including a major diameter and a minor diameter and has an air hole. The rotator normally contacts the two valve connectors with the minor diameter so that the two valve connectors are in a relaxed state, and when the rotator is rotated to have the major diameter contacting the two valve connectors, the two valve connectors are slightly deformed under compression and turned into a use state for connecting a valve, where the air hole is communicated with the air inlet of one of the valve connector while the air inlet of the other valve connector is closed by the cam portion into airtightness.

8 Claims, 10 Drawing Sheets

(51) Int. Cl.
*F16K 31/524* (2006.01)
*F16K 11/076* (2006.01)
*B60S 5/04* (2006.01)

(58) Field of Classification Search
USPC ............. 137/118.03, 119.06, 223, 231,
636,137/636.1, 636.3, 627, 628, 798, 229,
625.5; 251/251, 253–255, 257, 258, 352;
152/415, 152/421; 417/234, 469, 487
See application file for complete search history.

(56) References Cited

U.S. PATENT DOCUMENTS

| | | | | |
|---|---|---|---|---|
| 5,666,990 A | * | 9/1997 | Wu | ............................ B60S 5/04 137/223 |
| 6,843,270 B1 | * | 1/2005 | Wang | ........................ B60S 5/04 137/223 |
| 7,562,671 B2 | * | 7/2009 | Wang | .................... F04B 33/005 137/223 |

* cited by examiner

VERSATILE AIR-VALVE CONNECTING DEVICE

BACKGROUND OF THE INVENTION

1. Technical Field

The present invention relates to accessories of air pumps, and more particularly to a versatile air-valve connecting device.

2. Description of Related Art

As disclosed in Taiwan Patent Applicant No. 83201242, a tire-valve head includes a head housing defining a receiving room and having a valve connector. A rotator is received in the receiving room and has a cam structure. By rotating the rotator to reposition the cam to press the valve connector, the valve connector is elastically deformed to connect a valve. Such a configuration has only one valve connector, and is unable to work with different types of valves.

In Taiwan Patent Applicant No. 092217000, an air-pump connector for working with three types of valves is disclosed. The connector has three valve connecting members, and similarly implements a rotator having a cam to selectively open/closes these valve connecting members. While such a prior-art device is versatile in virtue of its three valve connecting members, it is bulky and structurally complicated. Since each of the valve connecting members has its own check valve, known device is expansive to manufacture and inconvenient to use.

BRIEF SUMMARY OF THE INVENTION

The primary objective of the present invention is to provide a compact, versatile air-valve connecting device, which is compatible to two to three different kinds of valves, and is structurally simple.

To achieve the foregoing objective, the disclosed versatile air-valve connecting device comprises: a housing, having a roughly T shape including a bottom that contains a central chamber and an upper arm contains a channel that runs through two ends thereof and is communicated with the central chamber, so that two receiving rooms are formed at two sides of the central chamber; a rotator, having a roughly lengthwise shape including a grip portion and a cam portion, the cam portion being inserted into the central chamber of the housing so that the grip portion is exposed outside the housing, the cam portion being disk-like and having a cross section including a major diameter and a minor diameter, the grip portion having an outer end axially indented to form a passage, the passage having an air hole that is open at the major diameter of the cam portion and is communicated with the channel; and two valve connectors, being received in the two receiving rooms, respectively, so as to slightly jut out into the central chamber for retaining the rotator from leaving the housing, wherein each of the two valve connectors has an air inlet that is communicated with the central chamber, wherein the rotator normally contacting the two valve connectors with the minor diameter so that the two valve connectors are in a relaxed state, and when the rotator is rotated to have the major diameter contacting the two valve connectors, the two valve connectors are slightly deformed under compression and turned into a use state for connecting a valve, where the air hole is communicated with the air inlet of one of the valve connector while the air inlet of the other valve connector is closed by the cam portion into airtightness.

DETAILED DESCRIPTION OF THE INVENTION

The following description is made with reference to one preferred embodiment and accompanying drawings. In the present embodiment of the present invention, a versatile air-valve connecting device (10) comprises a housing (20), a rotator (30), and two valve connectors (40)(50). The housing (20) is roughly T-shaped, with its bottom indented to form a central chamber (21). The upper arm of the T-shaped housing (20) contains a channel (22) running between its two ends and communicated with the central chamber (21), so as to form two receiving rooms (23) at two sides of the central chamber (21).

The rotator (30) is roughly lengthwise and has a grip portion (31) and a cam portion (32). The cam portion (32) is inserted to the central chamber (21) of the housing (20), with the grip portion (31) exposed outside the housing (20). The cam portion (32) is a disk-like member whose cross section has a major diameter (321) and a minor diameter (322). The grip portion (31) has an outer end axially indented to form a passage (33), and the passage (33) has an air hole (331) formed at the major diameter (321) of the cam portion (32) and communicated with the channel (22).

Figure 1:
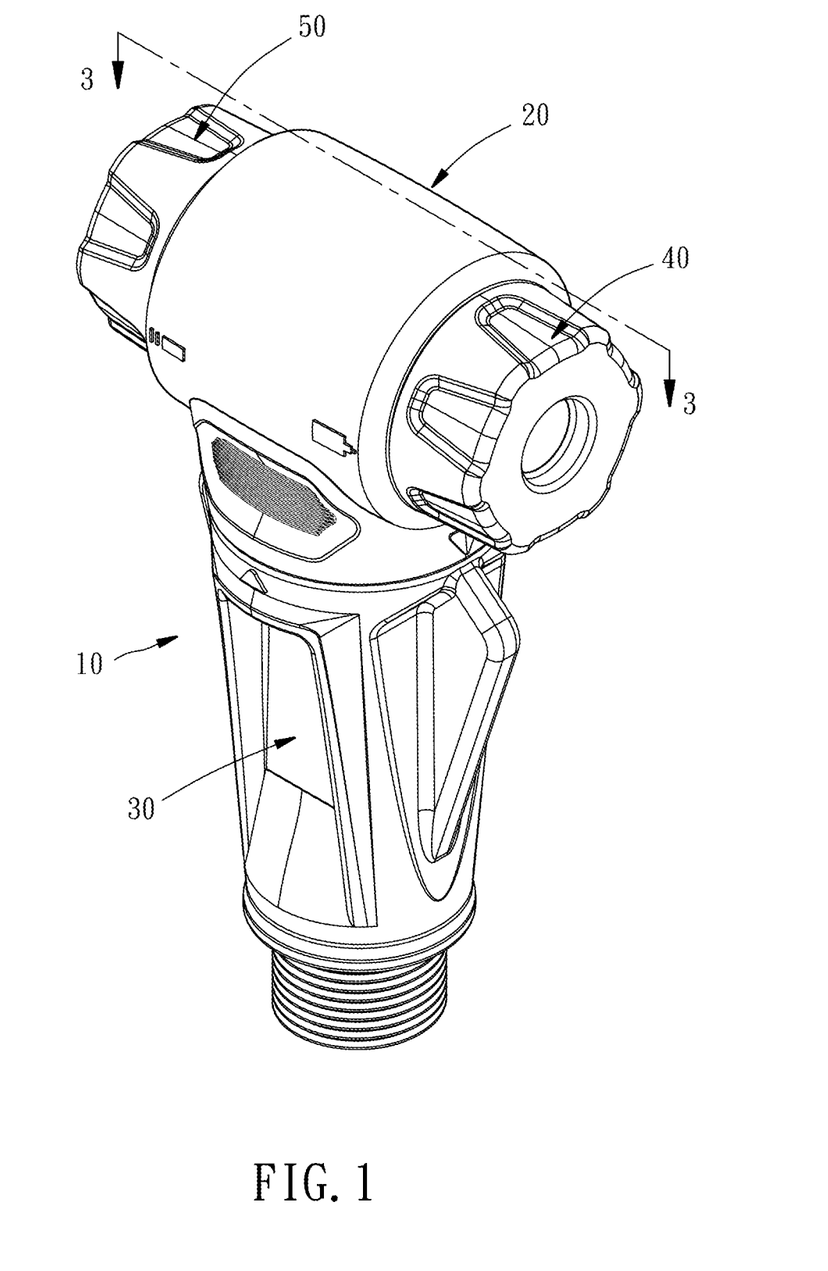
FIG. 1 is a perspective view of a versatile air-valve connecting device according to one embodiment of the present invention.
Figure 2:
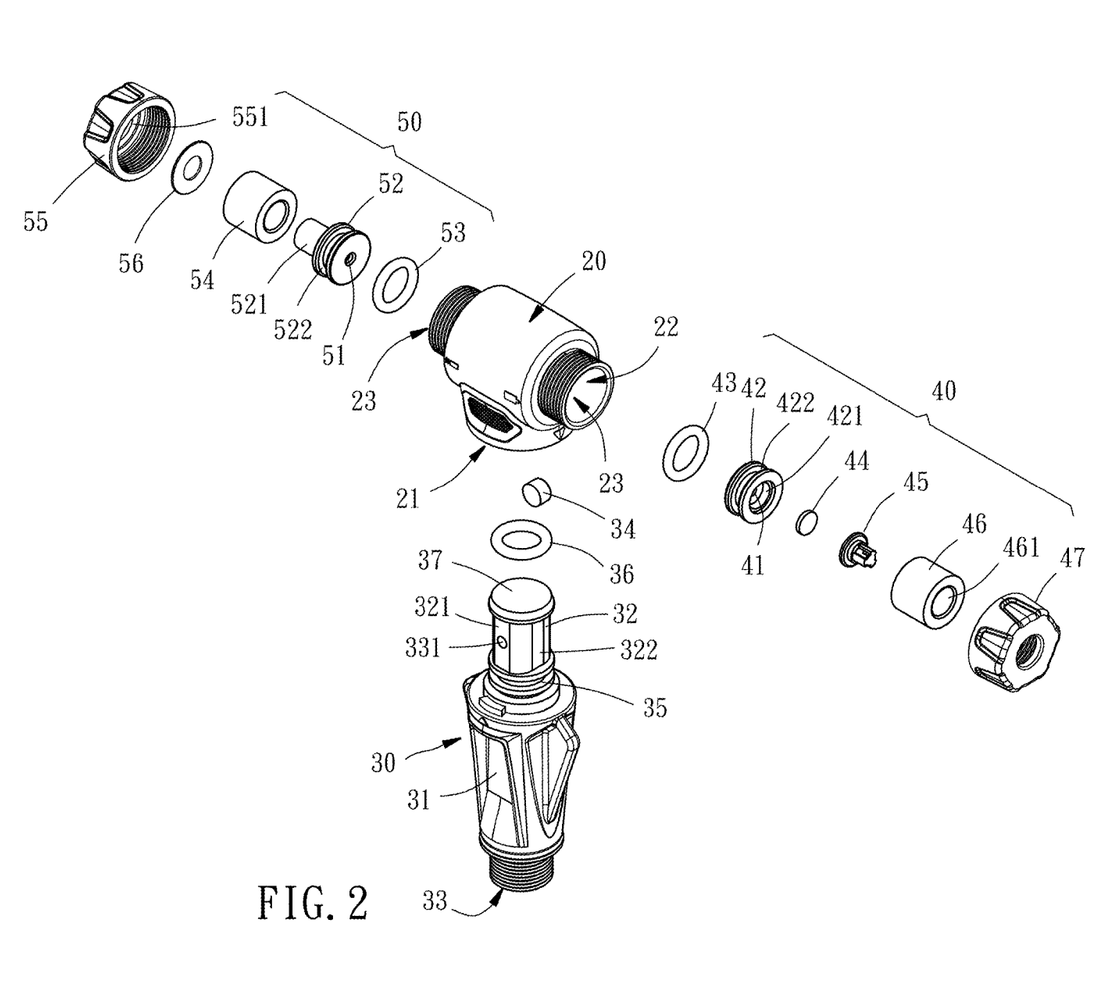
FIG. 2 is an exploded view of the versatile air-valve connecting device of FIG. 1.
Figure 3:
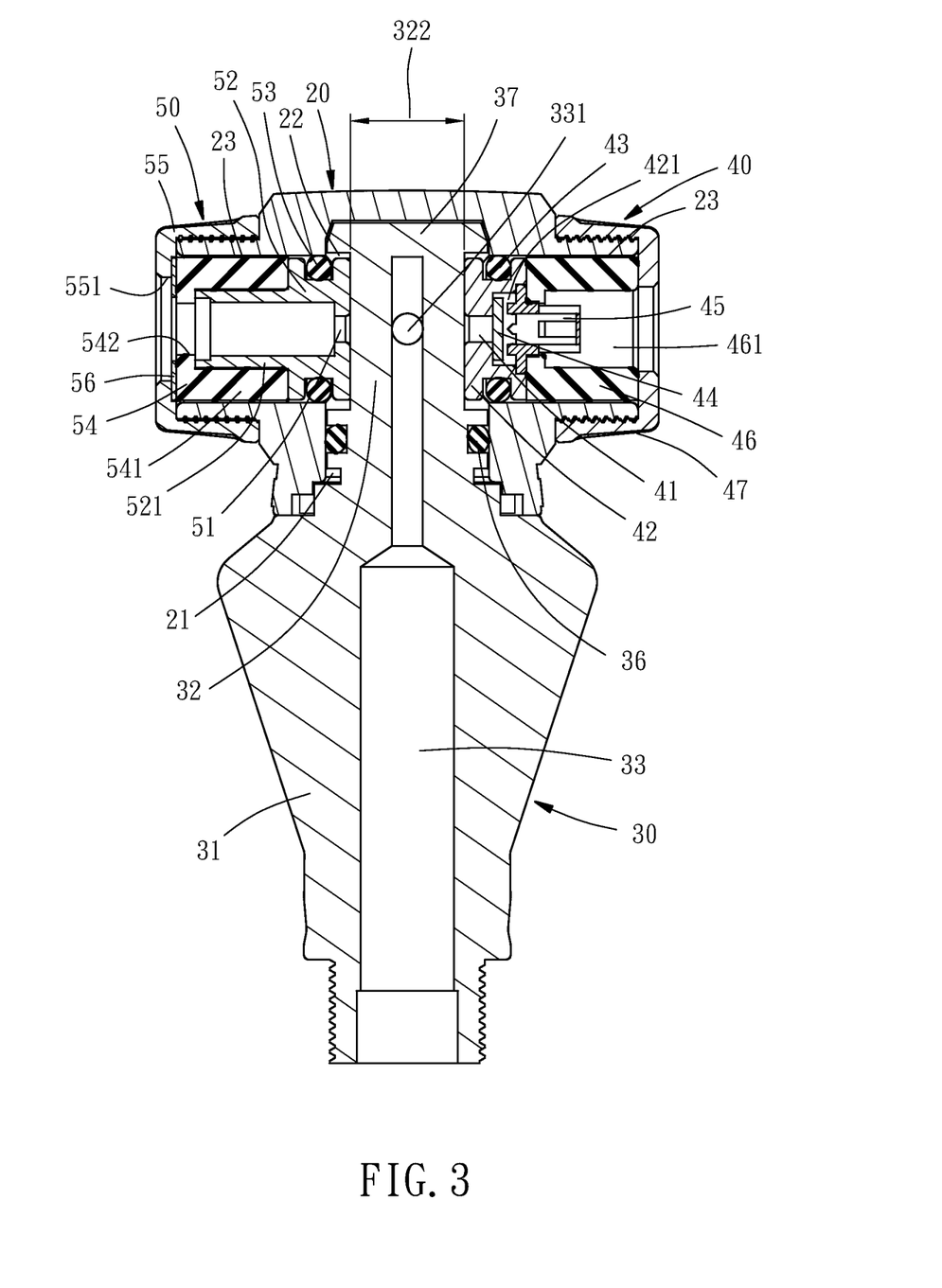
FIG. 3 is a cross-sectional view of the versatile air-valve connecting device taken along Line 3-3 of FIG. 1.
Figure 4:
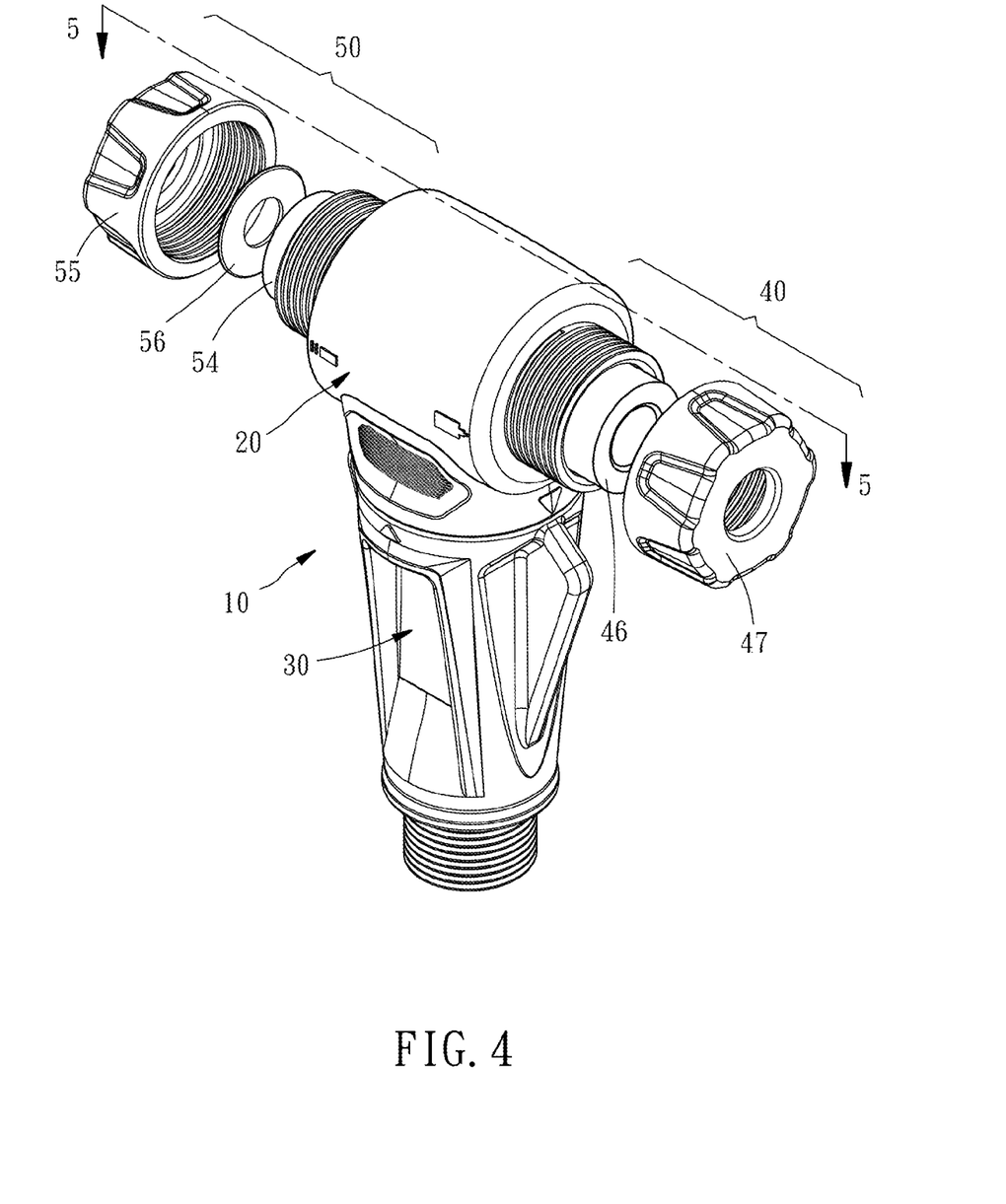
FIG. 4 is a partially exploded view of the versatile air-valve connecting device.
Figure 5:
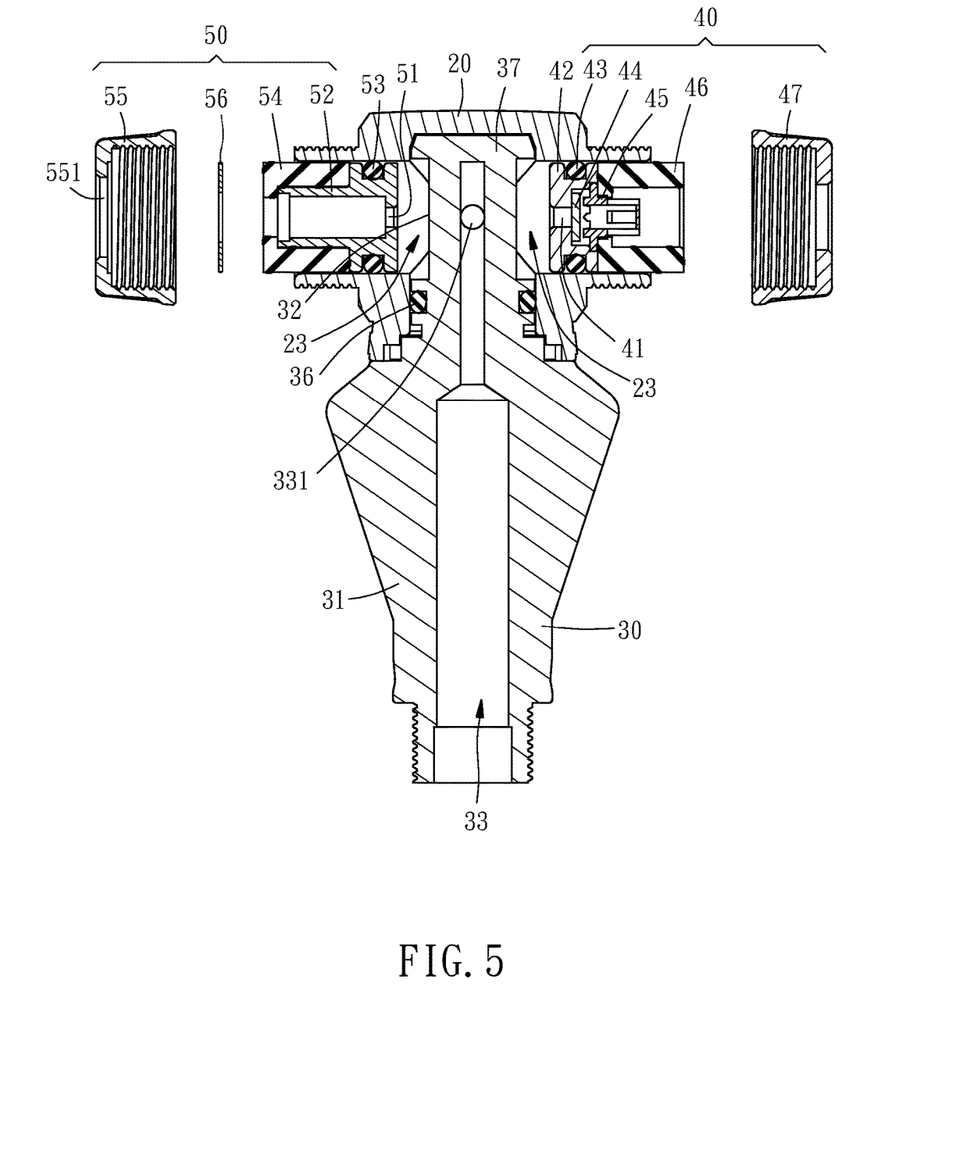
FIG. 5 is a cross-sectional view of the versatile air-valve connecting device taken along Line 5-5 of FIG. 4.
Figure 6:
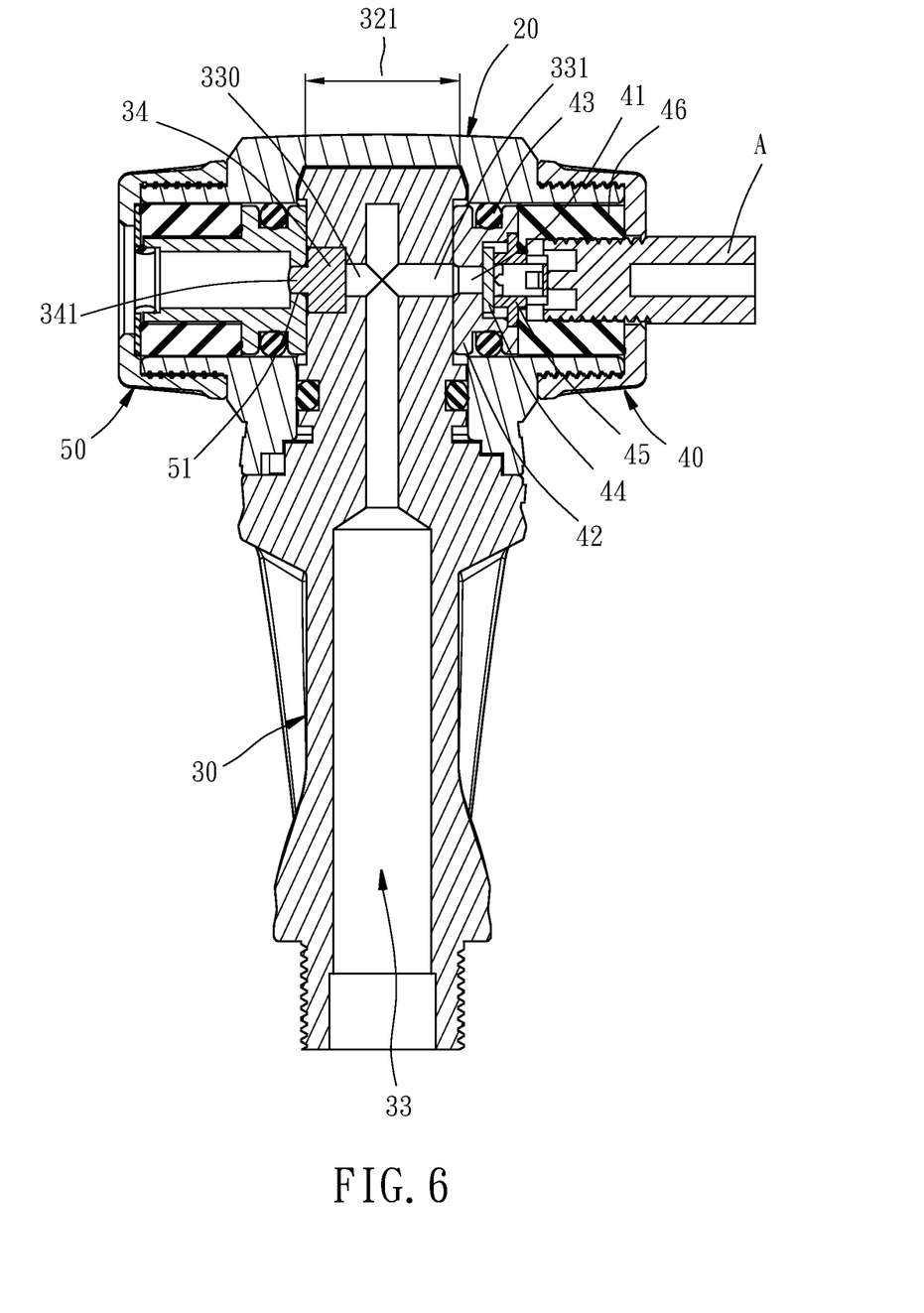
FIG. 6 is an applied view of the versatile air-valve connecting device showing its connection to a Schrader valve.
Figure 7:
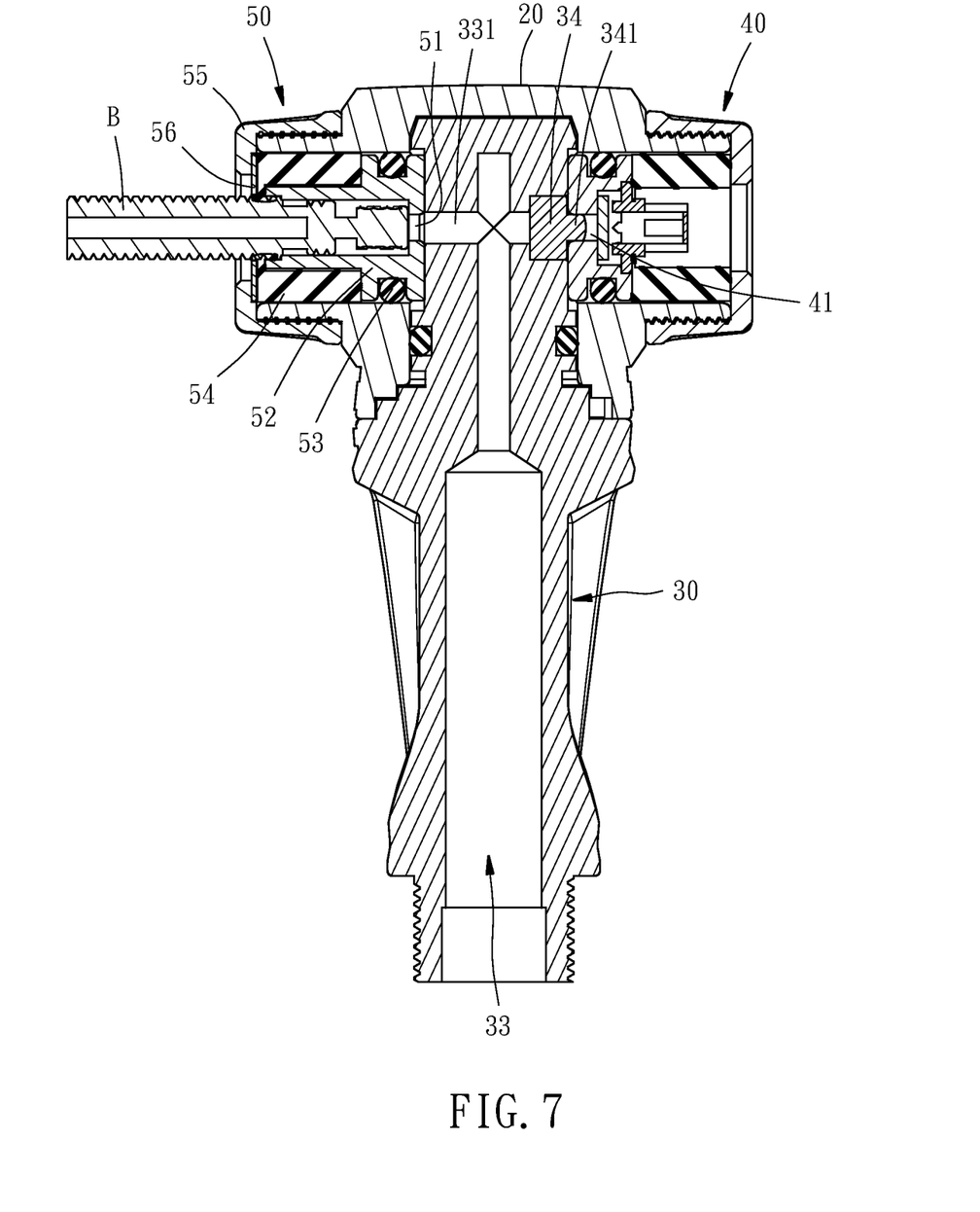
FIG. 7 is another applied view of the versatile air-valve connecting device showing its connection to a Presta valve.
Figure 8:
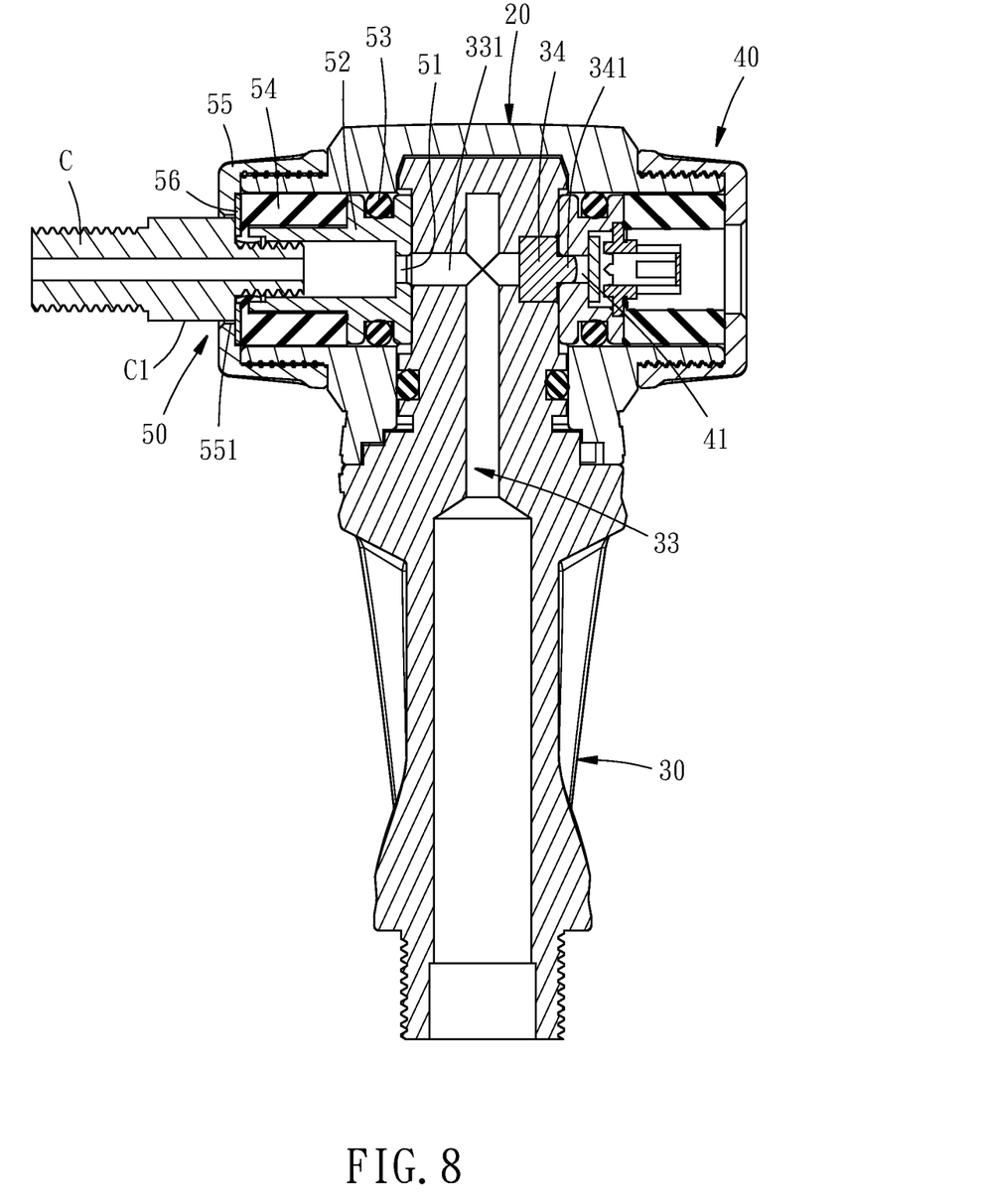
FIG. 8 is still another applied view of the versatile air-valve connecting device showing its connection to a Dunlop valve.

The two valve connectors (40)(50) are received in the two receiving rooms (23), respectively, and slightly jutting out into the central chamber (21), for retaining the rotator (30) from leaving the housing (20). In the present embodiment, a head (37) is provided at the outer end of the cam portion (32) of the rotator (30), so that the inner ends of the two valve connectors (40)(50) engage with the head (37). The two valve connectors (40)(50) each have an air inlet (41)(51) communicated with the central chamber (21). The rotator (30) normally contacts the two valve connectors (40)(50) with its minor diameter (322), so the two valve connectors (40)(50) are at a relaxed state (as shown in FIG. 3). When the rotator (30) is rotated to have its major diameter (321) contacting the two valve connectors (40)(50), the two valve connectors (40)(50) are slightly deformed under compression, and turned into a use state where a valve, i.e. a Schrader (American) valve (A), a Presta (French) valve (B), or a Dunlop (English) valve (C), can be connected thereto, as shown in FIGS. 6, 7 and 8. Taking the Schrader valve (A) for example, as shown in FIG. 6, the air hole (331) is now communicated with the air inlet (41) of the Schrader valve connector (40), while the air inlet (51) of the other valve connector (50) is closed by the cam portion (32) for airtightness.

For ensuring the airtightness between the cam portion (32) and the air inlets (41)(51) of the valve connectors (40)(50), the present embodiment further comprises a closer (34) provided at the major diameter (321) of the cam portion (32) on a surface reverse to that having the air hole (331). The closer (34) servers to selectively close one of the air inlets (41)(51) of the valve connector (40)(50).

In the present embodiment, the two valve connectors (40)(50) comprise a Schrader valve connector (40) and a Presta valve connector (50).

The Schrader valve connector (40) comprises a valve seat (42) like a round plate, with one surface indented as a sink (421). The air inlet (41) is formed at the wall on the sink (421). The valve seat (42) is peripherally formed with an annular groove (422) for receiving a seal ring (43) therein. A valve disc (44) is set in the sink (421), and a lift pin (45) is installed at the opening of the sink (421) of the valve seat (42) for retaining the valve disc (44) in place. An elastic sleeve (46) is mounted around the lift pin (45) and is elastically deformable upon compression. The axial hole (461) of the elastic sleeve (46) allows a Schrader valve (A) to insert therein. An end cap (47) is annular and screwed to the housing outer wall (24) at the open end of the receiving room (23) of the housing (20), for constricting the elastic sleeve (46), the lift pin (45), the valve disc (44) and the valve seat (42) in the receiving room (23). FIG. 6 shows that a Schrader valve (A) is connected.

The Presta valve connector (50) comprises a pin-like valve seat (52) having a columnar body portion (521). The body portion (521) has one end closed while being centrally formed with the air inlet (51) and terminally provided with two raised rings, so that an annular groove (522) is defined therebetween. A seal ring (53) is received in the annular groove (522). An elastic sleeve (54) has a columnar body portion (541). The body portion (541) has a peripherally inward raised shoulder portion (542). The elastic sleeve (54) has its columnar body portion (541) mounted around the body portion (521) of the valve seat (52) and has its shoulder portion (542) abutting against the body portion (521) of the valve seat (52). An annular end cap (55) is screwed to the housing outer wall (24) at the open end of the receiving room (23) of the housing (20), for constricting the elastic sleeve (54) and the valve seat (52) inside the receiving room (23). FIG. 7 shows that a Presta valve (B) is connected.

For making the Presta valve connector (50) compatible to a Dunlop valve, an annular stopper (56) is provided between the elastic sleeve (54) and the end cap (55), and the central passage (551) of the end cap (55) is diametrically enlarged to allow a head (C1) of a Dunlop valve (C) to pass therethrough. Thereby, the Presta valve connector (50) can be used to connect a Dunlop valve (C), as shown in FIG. 8.

For preventing air leakage at the joint between the rotator (30) and the housing (20), an annular groove (35) is formed between the cam portion (32) and the grip portion (31) of the rotator (30) for receiving a seal ring (36) therein.

For the convenient of manufacturing, the cam portion (32) of the rotator (30) has its major diameter (321) provided with a through hole (330) that is communicated with the passage (33) (as shown in FIG. 6), and a closer (34) is used to close one end of the through hole (330), so that the other end of the through hole (330) forms the air hole (331). The closer (34) has a raised protrusion (341) for selectively closing the air inlets (41)(51) of the valve connectors (40)(50). The closer (34) may be made of a relatively elastic material, so as to improve airtightness at the closed air inlets (41)(51).

Figure 9:
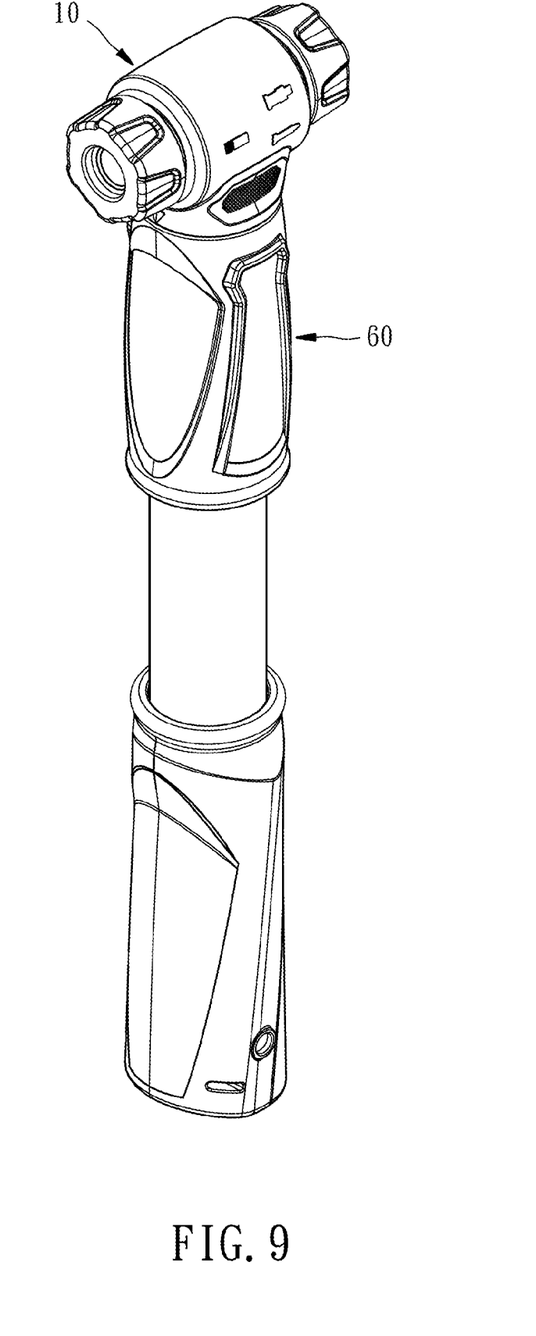
FIG. 9 shows the versatile air-valve connecting device assembled to a portable air pump.

FIG. 9 shows the versatile air-valve connecting device assembled to a portable air pump (60).

Figure 10:
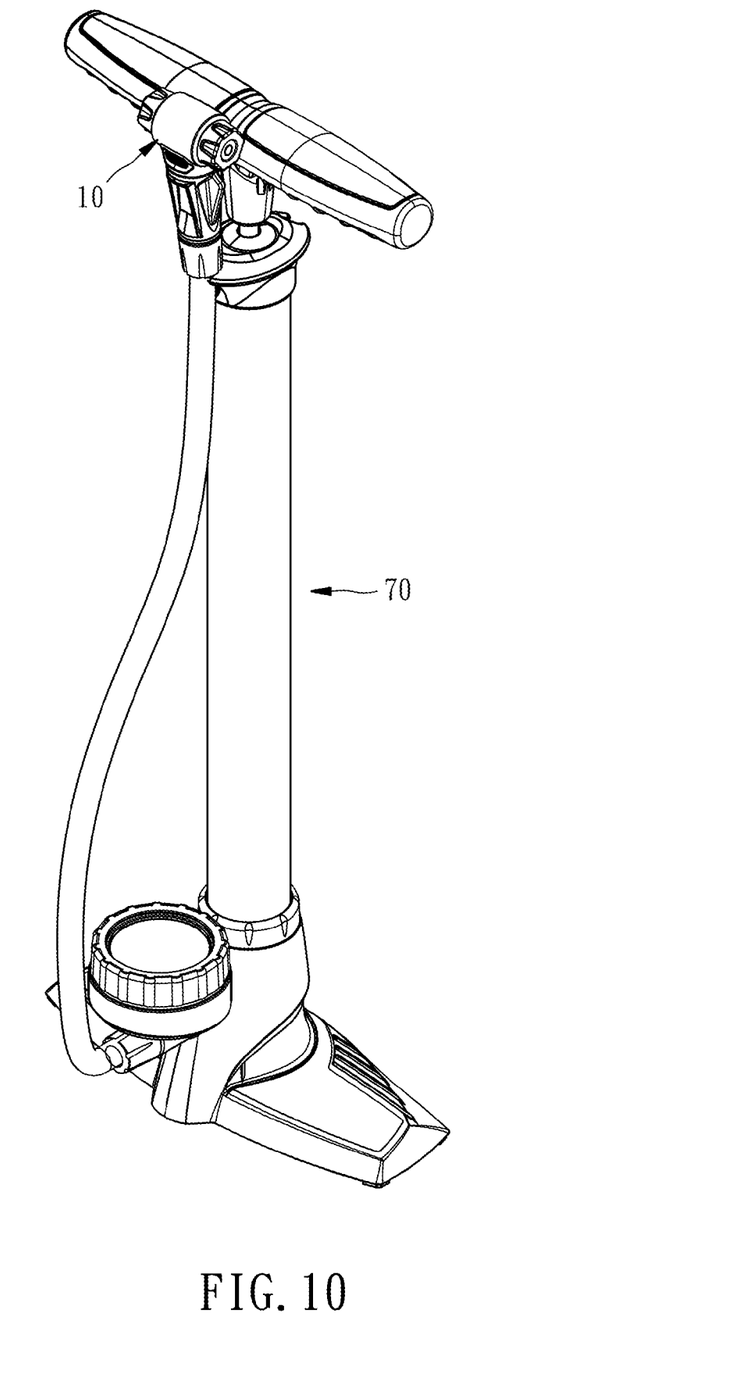
FIG. 10 shows the versatile air-valve connecting device assembled to a floor-standing air pump.

FIG. 10 shows the versatile air-valve connecting device assembled to a floor-standing air pump (70).

The disclosed air-valve connecting device is compact and use only two valve connector to work with three different types of air valves. In addition, the disclosed air-valve connecting device is structurally simple and easy to manufacture. Since it overthrows the conventional complicated configuration where each valve connector needs a check valve, the disclosed air-valve connecting device helps to significantly reduce manufacturing costs and improve productivity, while being convenient for users to carry out.

What is claimed is:

1. A versatile air-valve connecting device, comprising:
   a housing, having a roughly T shape including a bottom that contains a central chamber and an upper arm contains a channel that runs through two ends of the upper arm and is communicated with the central chamber, so that two receiving rooms are formed at two sides of the central chamber;
   a rotator, having a roughly lengthwise shape including a grip portion and a cam portion, the cam portion being inserted into the central chamber of the housing so that the grip portion is exposed outside the housing, the cam portion being disk-shaped and having a cross section including a major diameter and a minor diameter, the grip portion having an outer end axially indented to form a passage, the passage having an air hole that is open at the major diameter of the cam portion and is communicated with the channel; and
   two valve connectors, being received in the two receiving rooms, respectively, so as to slightly jut out into the central chamber for retaining the rotator from leaving the housing, wherein each of the two valve connectors has an air inlet that is communicated with the central chamber,
   wherein the rotator normally contacting the two valve connectors with the minor diameter so that the two valve connectors are in a relaxed state, and when the rotator is rotated to have the major diameter contacting the two valve connectors, the two valve connectors are slightly deformed under compression and turned into a use state for connecting a valve, where the air hole is communicated with the air inlet of one of the valve connector while the air inlet of the other valve connector is closed by the cam portion into airtightness.

2. The versatile air-valve connecting device of claim 1, wherein the cam portion comprises a closer on the major diameter at a surface reverse to a surface having the air hole, and the closer serves to selectively the air inlet of one of the valve connectors.

3. The versatile air-valve connecting device of claim 1, wherein the two valve connectors comprises a Schrader valve connector and a Presta valve connector.

4. The versatile air-valve connecting device of claim 3, wherein the Schrader valve connector comprises:
   a valve seat, being round plate-shaped, having a surface indented to form a sink, the sink having a wall provided with the air inlet, the valve seat being peripherally formed with an annular groove;

a seal ring, being received in the annular groove;
a valve disc, being received in the sink;
a lift pin, being deposited at an opening of the sink of the valve seat for retaining the valve disc;
an elastic sleeve, being mounted around the lift pin and elastically deformable under compression, the elastic sleeve having an axial hole for allowing the Schrader valve to inserted in the elastic sleeve; and
an end cap, being an annular member and screwed to an outer wall at an open end of the receiving room of the housing, for constricting the elastic sleeve, the lift pin, the valve disc and the valve seat inside the receiving room.

5. The versatile air-valve connecting device of claim 3, wherein the Presta valve connector comprises:
  a valve seat, being a pin-shaped member and having a columnar body portion, the body portion having one end closed and being centrally formed with the air inlet, and terminally provided with two raised rings, so that an annular groove is defined between the two raised rings;
  a seal ring, being received in the annular groove;
  an elastic sleeve, having a columnar body portion and a shoulder portion peripherally raised inward from the body portion, the elastic sleeve having the columnar body portion mounted around the body portion of the valve seat and having the shoulder portion abutting against the body portion of the valve seat;
  an end cap, being an annular member and screwed to an outer wall at an open end of the receiving room of the housing, for constricting the elastic sleeve and the valve seat inside the receiving room.

6. The versatile air-valve connecting device of claim 5, further comprising an annular stopper provided between the elastic sleeve and the end cap.

7. The versatile air-valve connecting device of claim 1, wherein an annular groove is formed between the cam portion and the grip portion of the rotator, and a seal ring is received in the annular groove.

8. The versatile air-valve connecting device of claim 2, wherein the rotator has a through hole formed at the major diameter of the cam portion to communicate with the passage, and has a closer closing one end of the through hole, so that an opposite end of the through hole forms the air hole, and the closer has a raised protrusion for closing the air inlet of the valve connector.

* * * * *